US012510849B2

(12) United States Patent
Kasai et al.

(10) Patent No.: US 12,510,849 B2
(45) Date of Patent: Dec. 30, 2025

(54) ELECTROPHOTOGRAPHIC BELT, ELECTROPHOTOGRAPHIC IMAGE FORMING APPARATUS, AND METHOD FOR MANUFACTURING ELECTROPHOTOGRAPHIC BELT

(71) Applicant: CANON KABUSHIKI KAISHA, Tokyo (JP)

(72) Inventors: Naoko Kasai, Kanagawa (JP); Masahiro Takenaga, Kanagawa (JP); Yasutomo Tsuji, Saitama (JP); Masatsugu Toyonori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/939,828

(22) Filed: Nov. 7, 2024

(65) Prior Publication Data

US 2025/0164911 A1 May 22, 2025

(30) Foreign Application Priority Data

Nov. 17, 2023 (JP) .................................. 2023196252
Jul. 31, 2024 (JP) .................................. 2024124522

(51) Int. Cl.
*G03G 15/16* (2006.01)
*G03G 15/01* (2006.01)

(52) U.S. Cl.
CPC ....... *G03G 15/162* (2013.01); *G03G 15/0189* (2013.01); *G03G 15/1605* (2013.01); *G03G 15/1685* (2013.01); *G03G 2215/1623* (2013.01)

(58) Field of Classification Search
CPC ............. G03G 15/162; G03G 15/0189; G03G 15/1605; G03G 15/1685; G03G 2215/1623
See application file for complete search history.

(56) References Cited

U.S. PATENT DOCUMENTS

| | | | | |
|---|---|---|---|---|
| 9,581,941 | B2 | 2/2017 | Egawa | |
| 2014/0113225 | A1* | 4/2014 | Yoshimura ......... | G03G 5/14734 399/302 |
| 2020/0174405 | A1* | 6/2020 | Uchida .................... | C08K 5/19 |
| 2021/0373482 | A1* | 12/2021 | Ishizumi ............ | G03G 21/0017 |

FOREIGN PATENT DOCUMENTS

JP 2014-146024 A 8/2014

OTHER PUBLICATIONS

U.S. Appl. No. 18/770,262, filed Jul. 11, 2024, Takenaga.

* cited by examiner

*Primary Examiner* — Joseph S Wong
(74) *Attorney, Agent, or Firm* — Venable LLP

(57) ABSTRACT

An electrophotographic belt is provided, which includes a base layer and a surface layer in direct contact with the base layer, wherein the surface layer includes heteroaggregates of a first particle and a second particle, the first particle is at least one selected from the group consisting of a hollow silica particle and a solid silica particle, and has a number-average particle diameter of primary particles, which is greater than 30 nm and less than 100 nm, the second particle contains a conductive metal oxide, and has a number-average particle diameter of primary particles, which is 5 nm to 40 nm, the surface layer has protruded portions derived from the heteroaggregates on an outer surface opposite to the surface facing the base layer, an arithmetic mean height (Sa) of the outer surface is 0.1 μm to 0.7 μm, and the base layer includes specific cation and anion.

12 Claims, 2 Drawing Sheets

ELECTROPHOTOGRAPHIC BELT, ELECTROPHOTOGRAPHIC IMAGE FORMING APPARATUS, AND METHOD FOR MANUFACTURING ELECTROPHOTOGRAPHIC BELT

BACKGROUND OF THE INVENTION

Field of the Invention

The present disclosure relates to an electrophotographic belt, an electrophotographic image forming apparatus, and a method for manufacturing an electrophotographic belt.

Description of the Related Art

In an electrophotographic image forming apparatus, an electrophotographic belt is used as a transport transfer belt for transporting a transfer material or an intermediate transfer belt for temporarily transferring and holding a toner image. The electrophotographic belt comes into contact with and slides against other members in the electrophotographic image forming apparatus, and when the surface of the electrophotographic belt is excessively smooth, the surface may adhere to other members.

For example, when a photosensitive drum or a cleaning blade adheres to the surface of the electrophotographic belt, stable rotation of the electrophotographic belt may be hindered. A decrease in the rotation stability of the electrophotographic belt may, for example, cause the moving speed of the electrophotographic belt to become unstable, which may result in a displacement when transferring toner images of respective colors to paper. Therefore, in order to prevent other members from adhering to the outer surface of the electrophotographic belt, conventionally the surface of the electrophotographic belt has been roughened.

As a method for roughening the surface of an electrophotographic belt, Japanese Patent Application Publication No. 2014-146024 discloses heteroaggregation of inorganic an oxide particle having a particle diameter of 10 nm to 30 nm and a conductive metal oxide particle having a particle diameter of 5 nm to 40 nm in the presence of alkali metal ions. Then, a protruded portion derived from the heteroaggregates is formed. Specifically, the base layer of the electrophotographic belt contains an alkali metal salt of a perfluoroalkylsulfonic acid or an alkali metal salt of a perfluoroalkylsulfonimide. A curable composition containing the inorganic oxide particle, the conductive metal oxide particle, an acrylic monomer, and a solvent is applied onto the base layer, and in the process of drying the solvent in the curable composition, the alkali metal ions in the base layer are transferred to the surface layer, causing heteroaggregation.

In the invention disclosed in Japanese Patent Application Publication No. 2014-146024, as the particle to be used for roughening in itself, a particle with a small particle diameter is used, thereby roughening the surface of the surface layer by forming heteroaggregates of particles with small particle diameter while preventing the formation of singularly large, protruded portions.

SUMMARY OF THE INVENTION

At least one aspect of the present disclosure is directed to providing an electrophotographic belt that uses a material that does not belong to PFAS and can suppress adhesion to other members. At least one aspect of the present disclosure is directed to providing a method for manufacturing an electrophotographic belt that uses a material that does not belong to the PFAS and can suppress adhesion to other members. Furthermore, at least one aspect of the present disclosure is directed to providing an electrophotographic image forming apparatus that can stably form high-quality electrophotographic images.

At least one aspect of the present disclosure is directed to providing an electrophotographic belt comprising:

a base layer; and a surface layer in direct contact with the base layer, wherein the surface layer comprises heteroaggregates of a first particle and a second particle different from the first particle, the first particle is at least one selected from the group consisting of a hollow silica particle and a solid silica particle, and has a number-average particle diameter of primary particles, which is greater than 30 nm and less than 100 nm, the second particle comprises a conductive metal oxide, and has a number-average particle diameter of primary particles of 5 nm to 40 nm, the surface layer has protruded portions derived from the heteroaggregates on an outer surface opposite to the surface facing the base layer, an arithmetic mean height (Sa) of the outer surface is 0.1 μm to 0.7 μm, and the base layer comprises at least one cation selected from the group consisting of cations represented by following formulas (C1) to (C4), and at least one anion selected from the group consisting of anions represented by following formulas (A1) to (A4).

According to at least one aspect of the present disclosure, a method for manufacturing an electrophotographic belt having a base layer and a surface layer in direct contact with the base layer, the method comprising the steps of:

preparing a base layer comprising a following component (e);

preparing a curable composition comprising following components (a) to (d);

forming a coating film of the curable composition on one surface of the base layer and drying the coating film; and curing the dried coating film:

(a) a first particle being at least one selected from the group consisting of a hollow silica particle and a solid silica particle, and having a number-average particle diameter of primary particles, which is greater than 30 nm and less than 100 nm, (b) a second particle being different from the first particle and comprising a conductive metal oxide, and moreover having a number-average particle diameter of primary particles of 5 nm to 40 nm;

(c) a (meth)acrylic monomer;

(d) at least one solvent selected from the group consisting of 2-butanone and 4-methyl-2-pentanone;

(e) a salt comprising at least one cation selected from the group consisting of cations represented by following formulas (C1) to (C4) and at least one anion selected from the group consisting of anions represented by following formulas (A1) to (A4).

According to at least one aspect of the present disclosure, an electrophotographic image forming apparatus is provided that comprises the electrophotographic belt as an intermediate transfer belt.

(C1)

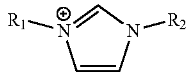

(C2)

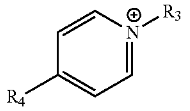

(C3)

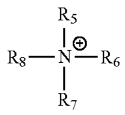

(C4)

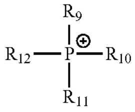

(A1)

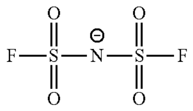

(A2)

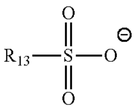

(A3)

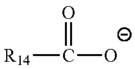

(A4)

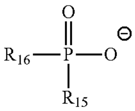

$R_1$ to $R_{12}$ are each independently a hydrogen atom or a hydrocarbon group having 1 to 14 carbon atoms, where at least one selected from the group consisting of $R_1$ and $R_2$, at least one selected from the group consisting of $R_3$ and $R_4$, at least one selected from the group consisting of $R_5$ to $R_8$, and at least one selected from the group consisting of $R_9$ to $R_{12}$ are linear or branched alkyl groups having 1 to 14 carbon atoms, and $R_{13}$ to $R_{16}$ are each independently a hydrogen atom, a hydrocarbon group having 1 to 18 carbon atoms, or an alkoxy group having 1 to 18 carbon atoms.

According to at least one aspect of the present disclosure, an electrophotographic belt can be obtained that uses a material that does not belong to PFAS and that can suppress adhesion to other members. Also, according to at least one aspect of the present disclosure, a manufacturing method for an electrophotographic belt can be obtained that uses a material that does not belong to PFAS and that can suppress adhesion to other members. Also, according to at least one aspect of the present disclosure, an electrophotographic image forming apparatus that can stably form high-quality electrophotographic images can be obtained.

Further features of the present invention will become apparent from the following description of exemplary embodiments with reference to the attached drawings.

DESCRIPTION OF THE EMBODIMENTS

Figure 1:
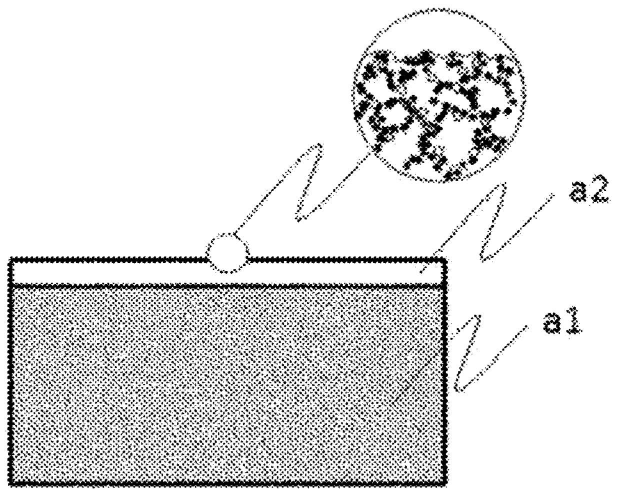
FIG. 1 is a cross-sectional schematic diagram of an electrophotographic belt.

In the present disclosure, "from XX to YY" or "XX to YY" indicating a numerical range means a numerical range including a lower limit and an upper limit that are end points unless otherwise specified. In a case where numerical ranges are described in stages, an upper limit and a lower limit of each numerical range can be combined as desired. Furthermore, in the present disclosure, for example, description such as "at least one selected from the group consisting of XX, YY, and ZZ" means any of XX, YY, ZZ, a combination of XX and YY, a combination of XX and ZZ, a combination of YY and ZZ, or a combination of XX, YY, and ZZ. When XX is a group, a plurality of constituents may be selected from XX, and the same applies to YY and ZZ.

In recent years, restrictions on the use of perfluoroalkyl and polyfluoroalkyl substances (hereinafter also referred to as "PFAS"), which are considered to have high environmental persistence and bioaccumulation, have been considered. In Japanese Patent Application Publication No. 2014-146024, an anion having a C—F bond in the molecule is used, and in the future, the salts described in Japanese Patent Application Publication No. 2014-146024 may become unusable due to restrictions. Therefore, the present inventors have considered forming protruded portions on the surface of the surface layer even when the base layer contains a salt of an anion that does not have a C—F bond in the molecule and does not belong to PFAS and an alkali metal cation.

The inventors formed a surface layer by applying a coating material for forming a surface layer according to Japanese Patent Application Publication No. 2014-146024 to a base layer containing a salt of an anion that does not belong to PFAS (hereinafter also referred to as "non-PFAS anion") and an alkali metal cation. However, heteroaggregation of the particles described in Japanese Patent Application Publication No. 2014-146024, i.e., inorganic oxide particles with an average primary particle diameter of 10 nm to 30 nm and conductive metal oxide particles with an average primary particle diameter of 5 nm to 40 nm, hardly occurred, and it was difficult to form a rough surface with an arithmetic mean height Sa of 0.1 μm to 0.7 μm on the outer surface of the surface layer.

The reason why heteroaggregation hardly occurred when a salt of a non-PFAS anion and an alkali metal cation was contained in the base layer is considered to be as follows. Non-PFAS anions have strong bonds with alkali metal cations due to localized negative charges, and salts of non-PFAS anions and alkali metal cations have a low degree of ion dissociation. It is presumed that this is why the alkali metal cations did not migrate sufficiently from the base layer to the surface layer, and heteroaggregates were not formed.

The inventors therefore conducted extensive research on the use of salts consisting of non-PFAS anions and cations, with the aim of roughening the outer surface of the surface layer by heteroaggregates. In the course of this research, the inventors first investigated the use of a specific organic cation larger in size than the alkali metal cation as a cation to be combined with an anion of the non-PFAS system, based on the above considerations.

Specifically, the use of at least one cation selected from the group consisting of the following formulas (C1) to (C4)

was investigated. This was intended to increase the degree of dissociation of the ionic conducting agent by increasing the distance between the anion and the cation and weakening the Coulomb force.

(C1)

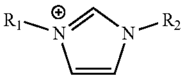

(C2)

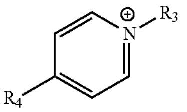

(C3)

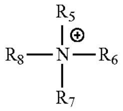

(C4)

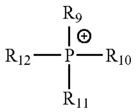

In formulas (C1) to (C4), $R_1$ to $R_{12}$ are each independently a hydrogen atom or a hydrocarbon group having 1 to 14 carbon atoms.

However, the ability of the ionic conducting agent consisting of the above cations and non-PFAS anions to form heteroaggregates was limited. This is thought to be because the above organic cations have a larger molecular weight and therefore a smaller surface charge density than alkali metal cations.

The inventors therefore investigated the optimal combination of first and second particles that would enable the formation of heteroaggregates of an appropriate size even with ionic conducting agents consisting of non-PFAS anions and the above organic cations. As a result, the inventors found that the following combination of ionic conducting agent, first particles, and second particles makes it possible to stably form protruded portions on the outer surface of the surface layer by the heteroaggregates of the first and second particles. As a result, a rough surface having an arithmetic mean height (Sa) of 0.1 μm to 0.7 μm can be formed on the outer surface of the surface layer.

Ionic Conducting Agent

The ionic conducting agent (salt) includes at least one cation selected from the group consisting of cations represented by the following formulas (C1) to (C4) and at least one anion selected from the group consisting of anions represented by the following formulas (A1) to (A4).

Anion

At least one anion selected from the group consisting of anions represented by the following formulas (A1) to (A4):

(A1)

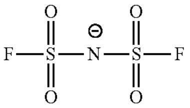

-continued (A2)

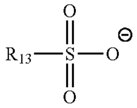

(A3)

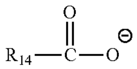

(A4)

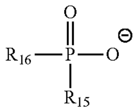

$R_{13}$ to $R_{16}$ are each independently a hydrogen atom, a hydrocarbon group having 1 to 18 carbon atoms, or an alkoxy group having 1 to 18 carbon atoms.

Cation

At least one cation selected from the group consisting of cations represented by the following formulas (C1) to (C4)

(C1)

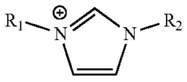

(C2)

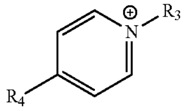

(C3)

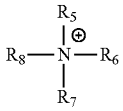

(C4)

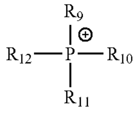

$R_1$ to $R_{12}$ are each independently a hydrogen atom or a hydrocarbon group having 1 to 14 carbon atoms, where at least one selected from the group consisting of $R_1$ and $R_2$, at least one selected from the group consisting of $R_3$ and $R_4$, at least one selected from the group consisting of $R_5$ to $R_8$, and at least one selected from the group consisting of $R_9$ to $R_{12}$ are linear or branched alkyl groups having 1 to 14 carbon atoms.

At least one selected from the group consisting of $R_1$ and $R_2$ is preferably a linear or branched alkyl group having 1 to 3 carbon atoms. At least one selected from the group consisting of $R_3$ and $R_4$ is preferably a linear or branched alkyl group having 1 to 10 carbon atoms. At least one selected from the group consisting of $R_5$ to $R_8$ and at least one selected from the group consisting of $R_9$ to $R_{12}$ is preferably a linear or branched alkyl group having 4 to 14 carbon atoms.

First Particle

The first particle is at least one selected from the group consisting of a hollow silica particle and a solid silica particle, and the number-average particle diameter of the primary particles of the first particles is greater than 30 nm and less than 100 nm.

Second Particle

The second particle is different from the first particle. The second particle contains a conductive metal oxide, and the number-average particle diameter of the primary particles of the second particles is 5 nm to 40 nm.

An embodiment of the electrophotographic belt is described hereinbelow in detail. The present disclosure is not limited to the following embodiment.

The surface of the surface layer can be roughened to have an arithmetic mean height (Sa) of 0.1 μm to 0.7 μm by, for example, the following method. An ionic conducting agent (salt) consisting of the non-PFAS anion and the cation is included in a base layer, and a coating film of a surface layer forming composition containing the first particles and the second particles is formed on the base layer. A small amount of the cations migrates from the base layer into the coating film of the surface layer forming composition, and the first particles and the second particles are aggregated (heteroaggregated) in the coating film due to an increase in the cation concentration in the coating film during the drying process of the coating film. The cation concentration in the coating film increases during the drying process of the coating film, and charges on the first particles and second particles in the coating become opposite in polarity, which results in the formation of heteroaggregates. This enables the formation of protruded portions derived from the heteroaggregates on the surface of the surface layer, and roughening of the surface layer with Sa in the above range can be achieved.

Here, the protruded portion derived from the heteroaggregate includes at least one selected from the group consisting of a protruded portion formed by the exposure of at least a part of the heteroaggregate on the surface of the surface layer, and a protruded portion formed by covering the surface of the heteroaggregate with a matrix resin in the surface layer.

By roughening the surface to an arithmetic mean height (Sa) of 0.1 μm to 0.7 μm, adhesion to other members can be suppressed. The arithmetic mean height (Sa) of the surface of the surface layer is preferably 0.1 μm to 0.6 μm.

The arithmetic mean height (Sa) of the surface of the surface layer can be adjusted, for example, by adjusting at least one element selected from the group consisting of the particle diameter of the first particles, the particle diameter of the second particles, the amount of the first particles, the amount of the second particles, and the amount of the ionic conducting agent.

The electrophotographic belt according to the present disclosure will be described hereinbelow.

FIG. 1 shows a cross-sectional schematic diagram of the electrophotographic belt. The electrophotographic belt has an electrophotographic seamless belt base layer a1 and a surface layer a2 in direct contact with the base layer.

The thickness of the base layer is not particularly limited, but is preferably 10 μm to 500 μm, particularly preferably from 30 μm to 150 am, and further preferably 50 m to 100 μm. The thickness of the surface layer is not particularly limited, but is preferably 0.05 μm to 20 am, particularly preferably 0.1 μm to 5 μm, and further preferably 1 μm to 3 μm.

Curable Composition

The surface layer can be, for example, a cured product of a curable composition such as the following.

Components of Curable Composition

The components of the curable composition for forming the surface layer are listed below. The curable composition contains components (a) and (b), and preferably contains components (a), (b), (c) and (d).

Component (a) (First Particles)

The first particle is a silica particle which is at least one selected from the group consisting of a hollow silica particle and a solid silica particle, and the number-average particle diameter of the primary particles of the first particles is greater than 30 nm and less than 100 nm.

Where the number-average particle diameter of the primary particles of the silica particles is 100 nm or more, there is a possibility that the number of singular points (lumps) will increase in the surface layer. The number-average particle diameter of the primary particles of the first particles is preferably 40 nm or more and less than 100 nm, more preferably 40 nm to 80 nm, and even more preferably 40 nm to 65 nm. By setting the number-average particle diameter of the primary particles of the first particles within the above ranges, the dispersion state in the curable composition (liquid) can be stabilized, and even when the curable composition is used to form a surface layer after long-term storage, a surface layer having an outer surface with Sa of 0.1 μm to 0.7 μm can be stably provided.

Moreover, it is more preferable that the first particle be a hollow silica particle. Since a hollow silica particle has a smaller specific gravity than a solid silica particle, it contributes to further extending the life of the curable composition. In other words, it is possible to obtain a curable composition that enables more stable production of the electrophotographic belt according to the present disclosure. The first particles can be used without surface treatment but may be surface-treated with a silane coupling agent or the like.

Moreover, it is preferable that the value obtained by dividing the maximum length of the primary particles of the first particle by the minimum length, i.e., the ratio of the maximum length to the minimum length, be 2.0 or less. The value of this ratio is preferably 1.0 to 2.0, more preferably 1.0 to 1.5, and even more preferably 1.0 to 1.3. Here, for example, hollow silica particles "Sururia 4110" (product name, JGC Catalysts and Chemicals Co., Ltd.) and colloidal silica "IPA-ST-L" (product name, Nissan Chemical Co., Ltd.) can be used as the first particles.

Component (b) (Second Particles)

The second particles, which are different from the first particles, include conductive metal oxide particles having a number-average particle diameter of the primary particles of 5 nm to 40 nm.

For example, where an electrophotographic belt is used as an intermediate transfer belt, the surface layer is required to be semiconductive. Therefore, conductive metal oxide particles are used as the second particles.

The number-particle diameter of the primary particles of the second particles is 5 nm to 40 nm, preferably 5 nm to 25 nm, and more preferably 15 nm to 25 nm. By setting the number-average particle diameter of the primary particles of the second particles within the above range, it is possible to prevent the formation of singular points (lumps) on the outer surface of the surface layer. In addition, the dispersion state in the curable composition (liquid) can be stabilized, and even when the curable composition is used to form a surface layer after long-term storage, a surface layer having an outer surface with Sa of 0.1 μm to 0.7 μm can be stably provided. The second particles may be surface-treated to enhance dispersion stability in an organic solvent. Furthermore, the conductive metal oxide particles may be used by combining two or more types of particles.

Moreover, it is preferable that the value obtained by dividing the maximum length of the primary particles of the second particle by the minimum length, that is, the ratio of the maximum length to the minimum length, be 2.0 or less. The value of this ratio is preferably 1.0 to 2.0, more preferably 1.0 to 1.5, and even more preferably 1.0 to 1.3.

The second particles preferably include at least one particle selected from the group consisting of a zinc antimonate particle and an antimony-containing tin oxide particle. The conductive metal oxide particles may be commercially available products such as Celnax CX-Z410K (product name) manufactured by Nissan Chemical Industries, Ltd., Celnax CX-Z400K (product name) manufactured by Nissan Chemical Industries, Ltd., and SN-100P (product name) manufactured by Ishihara Sangyo Kaisha, Ltd.

Component (c)

Monomer of Matrix Resin

The surface layer preferably contains a matrix resin. That is, the surface layer preferably contains heteroaggregates of the first particles and second particles in a matrix resin.

The matrix resin is not particularly limited, and known resins used in the surface layer of electrophotographic belts such as intermediate transfer belts can be used. The matrix resin preferably contains at least a (meth)acrylic resin, since it has excellent resistance to scratches on the outer surface of the surface layer. In this case, the curable composition used to form the surface layer preferably contains, for example, a (meth)acrylic monomer as a monomer that forms the matrix resin.

The (meth)acrylic monomer is not particularly limited, but polyfunctional (meth)acrylic monomers are preferred from the viewpoint of abrasion resistance and hardness. Suitable examples include pentaerythritol tri(meth)acrylate, pentaerythritol tetra(meth)acrylate, trimethylolpropane tri(meth)acrylate, EO-modified trimethylolpropane tri(meth)acrylate, PO-modified trimethylolpropane tri(meth)acrylate, dipentaerythritol penta- and hexa(meth)acrylates, isocyanuric acid EO-modified di- and tri(meth)acrylate, and the like. The acrylic monomer preferably contains dipentaerythritol penta- and hexa(meth)acrylates. It is also possible to use a plurality of acrylic monomers to adjust the cure shrinkage and viscosity.

In addition, commercially available products such as Aronix M-305 (product name) from Toagosei Co., Ltd. can be used.

The content of the matrix resin in the surface layer is preferably 60.0% by mass to 85.0% by mass, and more preferably 65.0% by mass to 80.0% by mass based on the mass of the surface layer.

Component (d)

Solvent

From the viewpoint of stably dispersing or dissolving the component (e) described below in addition to the components (a), (b), and (c) described above, it is preferable that the curable composition contain a solvent. The solvent preferably contains at least one selected from the group consisting of 2-butanone and 4-methyl-2-pentanone.

It is also possible to add multiple solvents other than those mentioned above in order to adjust the evaporation rate and viscosity. Specific examples of the solvents include the following.

Alcohols such as methanol, ethanol, isopropanol, butanol, and octanol;

ketones such as acetone and cyclohexanone;

esters such as ethyl acetate, butyl acetate, ethyl lactate, γ-butyrolactone, propylene glycol monomethyl ether acetate, and propylene glycol monoethyl ether acetate;

ethers such as ethylene glycol monomethyl ether and diethylene glycol monobutyl ether, and aromatic hydrocarbons such as benzene, toluene, and xylene; and amides such as dimethylformamide, dimethylacetamide, and N-methylpyrrolidone.

Among these, methyl isobutyl ketone, methyl ethyl ketone, cyclohexanone, propylene glycol monomethyl ether acetate, propylene glycol monoethyl ether acetate, toluene, and xylene are preferred.

The curable composition for forming the surface layer, which contains the above-mentioned components (a) and (b), and preferably contains components (a) to (d), may contain the following component (e) as necessary.

Component (e) (Ionic Conducting Agent)

Where particles with a relatively large average primary particle diameter that are capable of forming a rough surface with Sa of 0.1 μm to 0.7 μm on the outer surface of the surface layer are included in the coating material for forming the surface layer, it is difficult to avoid the formation of singular projections due to the aggregation of particles in the coating material. Meanwhile, in the present disclosure, the above-mentioned first particles, which are too small to achieve Sa within the above range, and the second particles are heteroaggregated by the action of an ionic conducting agent. By forming protruded portions on the surface of the surface layer using the heteroaggregates, it is possible to achieve stable roughening while preventing the formation of singular projections on the outer surface of the surface layer.

The heteroaggregation of the first particles and second particles can be achieved, for example, by the action of the component (e). For example, a coating film of the curable composition is formed on a base layer containing the following component (e), and in the process of drying the coating film, at least a part of the cationic component of the ionic conducting agent migrates from the base layer into the coating film. As the solvent in the coating film evaporates, the cation concentration in the coating film increases, and the charges of the first particles and second particles in the coating film become opposite in polarity, which results in the formation of heteroaggregates.

As described above, by including the component (e) in the base layer and causing the migration of cations from the base layer to the coating film on the base layer, it is possible to generate heteroaggregates in the coating film, but this approach is not limiting. The component (e) may be included in the curable composition as one component thereof, or the component (e) may be included in both the base layer and the curable composition. However, in order to extend the life of the curable composition as a coating material for the surface layer, it is preferable that the curable composition does not contain the component (e).

The component (e) contains at least one cation selected from the group consisting of cations represented by formulas (C1) to (C4) and at least one anion selected from the group consisting of anions represented by formulas (A1) to (A4). Formulas (C1) to (C4) and formulas (A1) to (A4) are as described above.

Sufficient ionic dissociation into the anions and cations is preferable for forming heteroaggregates. However, since the anions represented by formulas (A1) to (A4) are non-PFAS anions and have localized negative charges, salts containing the anions represented by formulas (A1) to (A4) are less likely to dissociate into anions and cations that salts containing PFAS anions. Cations represented by formulas (C1) to (C4) are examples of cations that promote ionic dissociation even in the case of non-PFAS anions.

The cations represented by formulas (C1) to (C4) will be described in detail hereinbelow.

In formulas (C1) to (C4), $R_1$ to $R_{12}$ each independently represent a hydrogen atom or a hydrocarbon group having 1 to 14 carbon atoms. However, at least one selected from the group consisting of $R_1$ and $R_2$, at least one selected from the group consisting of $R_3$ and $R_4$, at least one selected from the group consisting of $R_5$ to $R_8$, and at least one selected from the group consisting of $R_9$ to $R_{12}$ are linear or branched alkyl groups having 1 to 14 carbon atoms.

Examples of the hydrocarbon group include linear or branched saturated hydrocarbon groups, linear or branched unsaturated hydrocarbon groups, substituted or unsubstituted saturated alicyclic hydrocarbon groups, substituted or unsubstituted unsaturated alicyclic hydrocarbon groups, substituted or unsubstituted aromatic hydrocarbon groups, and the like.

It is preferable that $R_1$ and $R_2$ be each independently a straight or branched alkyl group having 1 to 8 (more preferably 1 to 4, and even more preferably 1 to 3) carbon atoms.

It is preferable that $R_3$ and $R_4$ be each independently a straight or branched alkyl group having 1 to 8 (more preferably 1 to 4) carbon atoms.

It is preferable that $R_5$ to $R_8$ be each independently a straight or branched alkyl group having 1 to 10 carbon atoms.

It is preferable that $R_9$ to $R_{12}$ be each independently a straight or branched alkyl group having 4 to 14 carbon atoms.

Specific examples of the imidazolium cations shown in formula (C1) are listed below.

1-Ethyl-3-methylimidazolium cation, 1-butyl-3-methylimidazolium cation, 1-hexyl-3-methylimidazolium cation, 1-octyl-3-methylimidazolium cation, 1-octyl-3-methylimidazolium cation.

Specific examples of the pyridinium cations shown in formula (C2) are listed below.

1-Ethylpyridinium ion, 1-butylpyridinium ion, 1-hexylpyridinium ion, 1-octylpyridinium ion, 1-(tert-butyl)pyridinium ion, 1-octyl-4-methylpyridinium ion, and 1-octyl-4-butylpyridinium ion.

Specific examples of the quaternary ammonium cations shown in formula (C3) are listed below.

Ammonium ion, trimethylpropylammonium ion, tributylmethylammonium ion, tetraethylammonium ion, tributylethylammonium ion, methyltrioctylammonium ion, methyltridodecylammonium ion, trihexyltetradecylammonium ion. More preferably, tributylmethylammonium ion and tributylethylammonium ion.

Specific examples of the phosphonium cations shown in (C4) are listed below.

Phosphonium ion, trimethylpropylphosphonium ion, tributylmethylphosphonium ion, tetraethylphosphonium ion, tributylethylphosphonium ion, methyltrioctylphosphonium ion, methyltridodecylphosphonium ion, trihexyltetradecylphosphonium ion. More preferably, trihexyltetradecylphosphonium ion.

The anion may be a non-PFAS anion that does not contain a C—F bond, but specifically, anions shown in formulas (A1) to (A4) can be used.

The anions shown in (A1) to (A4) will be described in detail hereinbelow.

The anion shown in formula (A1) is a fluorosulfonylimide anion that does not have a C—F bond in the molecule and does not belong to PFAS.

In (A2) to (A4), $R_{13}$ to $R_{16}$ each independently represent a hydrogen atom, a hydrocarbon group having 1 to 18 carbon atoms, or an alkoxy group having 1 to 18 carbon atoms. Examples of the hydrocarbon group include linear or branched saturated hydrocarbon groups, linear or branched unsaturated hydrocarbon groups, substituted or unsubstituted saturated alicyclic hydrocarbon groups, substituted or unsubstituted unsaturated alicyclic hydrocarbon groups, and substituted or unsubstituted aromatic hydrocarbon groups.

Preferred examples of $R_{13}$ include a hydrogen atom, a linear or branched alkyl group having 1 to 6 carbon atoms (more preferably 1 to 3 carbon atoms), and a substituted or unsubstituted aryl group (specifically, for example, an unsubstituted phenyl group, or a phenyl group substituted with an alkyl group having 1 to 3 carbon atoms (more preferably 1 or 2 carbon atoms)).

Preferred examples of $R_{14}$ include alkyl groups having 3 to 15 carbon atoms (more preferably 6 to 12 carbon atoms).

Preferred examples of $R_{15}$ and $R_{16}$ each independently include linear or branched alkyl groups having 3 to 15 carbon atoms (more preferably 6 to 12 carbon atoms).

Specific examples of the anions shown in formula (A2) are listed hereinbelow.

Sulfonate ion, methanesulfonate ion, ethanesulfonate ion, 1-butanesulfonate ion, p-toluenesulfonate ion (tosylate ion), 1-octanesulfonate ion, 1-decanesulfonate ion, 1-tetradecanesulfonate ion, 1-octadecanesulfonate ion, hydrogen sulfate ion, methyl sulfate ion, ethyl sulfate ion, 1-butyl sulfate ion, 1-octyl sulfate ion, 1-decyl sulfate ion, 1-tetradecyl sulfate ion, 1-octadecyl sulfate ion. More preferably, methanesulfonate ion, ethanesulfonate ion, p-toluenesulfonate ion, and hydrogen sulfate ion.

Specific examples of the anions shown in formula (A3) are listed hereinbelow.

Methanoate ion, ethanoate ion, butanoate ion, hexanoate ion, benzoate ion, octanoate ion, decanoate ion, dodecanoate ion, tetradecanoate ion, hexadecanoate ion, octadecanoate ion, methyl carbonate ion, ethyl carbonate ion, butyl carbonate ion, hexyl carbonate ion, octyl carbonate ion, decyl carbonate ion, tetradecyl carbonate ion, and octadecyl carbonate ion. Decanoate ion is more preferred.

Specific examples of the anions shown in formula (A4) are listed hereinbelow.

Phosphinate ion, dimethylphosphinate ion, ethylmethylphosphinate ion, diethylphosphinate ion, dibutylphosphinate ion, bis(2,4,4-trimethylpentyl)phosphinate ion, dioctylphosphinate ion, ditetradecylphosphinate ion, dioctadecylphosphinate ion, dimethyl phosphate ion, diethyl phosphate ion, and dibutyl phosphate ion. More preferably, at least one selected from the group consisting of diethylphosphinate ion and bis(2,4,4-trimethylpentyl)phosphinate ion, and even more preferably, bis(2,4,4-trimethylpentyl)phosphinate ion.

Particularly preferred examples of the anion component include the anions shown in Table 2 below.

Furthermore, examples of combinations of cations and anions preferred as component (e) include the combinations shown in Table 2 below.

Radical Polymerization Initiator

Examples of radial polymerization initiator include compounds that generate active radical species thermally (thermal polymerization initiators) and compounds that generate active radical species under irradiation with radiation (light) (radiation (photo) polymerization initiators).

Radiation (photo) polymerization initiators are not particularly limited as long as they are decomposed by irradiation with light to generate radicals and initiate polymerization, and examples thereof include the following.

Acetophenone, acetophenone benzyl ketal, 1-hydroxycyclohexyl phenyl ketone, 2,2-dimethoxy-1,2-diphenylethan-1-one, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, 2-benzyl-2-dimethylamino-1-(4-morpholinophenyl)-butanone, 1,4-(2-hydroxyethoxy)phenyl-(2-hydroxy-2-propyl)ketone, 2,4,6-trimethylbenzoyldiphenylphosphine oxide, bis-(2,6-dimethoxybenzoyl)-2,4,4-trimethylpentylphosphine oxide, oligo(2-hydroxy-2-methyl-1-(4-(1-methylvinyl)phenyl)propanone), and the like.

The amount of the radical polymerization initiator is preferably 0.01 parts by mass to 10 parts by mass, more preferably 0.1 parts by mass to 5 parts by mass, per 100 parts by mass of component (c). Where the amount is 0.01 parts by mass or more, the cured product has sufficient hardness, and where the amount is 10 parts by mass or less, the cured product is sufficiently cured to the inside (lower layer).

Other Components

Other components can be added to the curable composition as necessary, as long as the effects of the present disclosure are not impaired. For example, polymerization inhibitors, polymerization initiation aids, leveling agents, wettability improvers, surfactants, plasticizers, UV absorbers, antioxidants, antistatic agents, inorganic fillers, pigments, and the like can be added.

Method for Manufacturing Curable Composition

A method of manufacturing the curable composition is not particularly limited, but since the curable composition contains the component (a) and component (b), which are particulate substances, and the component (c), which often has high viscosity, the following manufacturing method is preferred.

A slurry in which the component (a) is dispersed in a solvent, a slurry in which the component (b) is dispersed in a solvent, and a solution in which the component (c) is dissolved in a solvent are prepared in advance. Then, these components, the component (d), the component (e), the polymerization initiator, and other components are compounded as described below, placed in a container equipped with a stirrer, and stirred, for example, for 30 min at room temperature to obtain a curable composition. The concentration of the slurries or solution may be set within a range that makes it easy to stir. For example, the total amount of the solvent is preferably 200 parts by mass to 2000 parts by mass, or 500 parts by mass to 1200 parts by mass, per 100 parts by mass of the total of the component (a), component (b), and component (c).

Curing Method

It is preferable to obtain a base layer by curing the curable composition. The curable composition can be cured by heat or radiation (light, electron beam, and the like). There is no particular restriction as long as it is active radiation that can impart energy sufficient to generate polymerization initiation species, and the radiation broadly includes $\alpha$ rays, $\gamma$ rays, X-rays, ultraviolet rays (UV), visible light, electron beams, and the like. Among these, ultraviolet light and electron beams are preferred from the viewpoint of curing sensitivity and availability of the equipment, and ultraviolet light is particularly preferred.

Electrophotographic Belt

The electrophotographic belt will be described hereinbelow.

The electrophotographic belt is made up of multiple layers, and the surface layer can be formed using the above-mentioned curable composition. An embodiment of a two-layer belt consisting of a base layer and a surface layer is described hereinbelow. The electrophotographic belt may have other layers such as an inner layer.

Component (f)

Resin

As described above, the base layer can be a cured product of a resin composition for forming the base layer that contains the component (e) and a resin. It is preferable that the resin used to form the base layer could contain the component (e) and that the component (e) could migrate to the curable composition side. There are no particular limitations on the resin used to form the base layer, and various resins can be used. Specific examples of suitable resins include polyimides (PI), polyamideimides (PAI), polypropylene (PP), polyethylene (PE), polyamides (PA), polylactic acid (PLLA), polyethylene terephthalate (PET), polyethylene naphthalate (PEN), polyphenylene sulfide (PPS), polyether ether ketone (PEEK), polycarbonates (PC), and fluororesins (PVdF and the like), and the like, as well as blends of these resins. In particular, the resin is preferably at least one selected from the group consisting of polyethylene terephthalate (PET) and polyethylene naphthalate (PEN).

The resin composition may contain other components as necessary. Other components include ionic conducting agents (for example, polymeric ionic conducting agents, surfactants), conductive polymers, antioxidants (for example, hindered phenols, phosphorus, sulfur), ultraviolet absorbers, organic pigments, inorganic pigments, pH adjusters, crosslinking agents, compatibilizers, release agents (for example, silicones, fluorine-containing compounds), crosslinking agents, coupling agents, lubricants, insulating fillers (for example, zinc oxide, barium sulfate, calcium sulfate, barium titanate, potassium titanate, strontium titanate, titanium oxide, magnesium oxide, magnesium hydroxide, aluminum hydroxide, talc, mica, clay, kaolin, hydrotalcite, silica, alumina, ferrite, calcium carbonate, barium carbonate, nickel carbonate, glass powder, quartz powder, glass fiber, alumina fiber, potassium titanate fiber, and fine particles of thermosetting resin), conductive fillers (for example, carbon black, carbon fiber, conductive titanium oxide, conductive tin oxide, and conductive mica), and ionic liquids. These can be used alone or in combination of two or more types.

Method for Manufacturing Base Layer

A method for manufacturing the base layer is not particularly limited, and a molding method suitable for various resins may be used. The base layer can be obtained by heating and molding, as necessary, a resin composition containing the components (e) and (f). Examples of molding methods include extrusion molding, inflation molding, blow molding, centrifugal molding, and the like. After the components (e) and (f) are melt-kneaded to obtain a resin composition, the resin composition can be extrusion-molded to obtain a cylindrical film-shaped base layer. A known device such as a twin-screw kneading extruder can be used for melt-kneading.

In the examples and comparative examples described below, the base layer was obtained by extrusion molding.

Method for Forming Surface Layer

The surface layer has protruded portions derived from the heteroaggregates on the outer surface opposite to the surface facing the base layer. The method of manufacturing the surface layer is not particularly limited, but as described above, it is preferable to have a step of applying a curable composition to the base layer and curing to obtain the surface layer.

The method for producing an electrophotographic belt more preferably comprises the steps of:

preparing a base layer including a following component (e);

preparing a curable composition including following components (a) to (d);

forming a coating film of the curable composition on one surface of the base layer and drying the coating film; and curing the dried coating film.

(a) first particles each being at least one selected from the group consisting of a hollow silica particle and a solid silica particle, a number-average particle diameter of primary particles of the first particles being greater than 30 nm and less than 100 nm, (b) second particles that are different from the first particles and include a conductive metal oxide, a number-average particle diameter of primary particles of the second particles being from 5 nm to 40 nm;

(c) a (meth)acrylic monomer;

(d) at least one solvent selected from the group consisting of 2-butanone and 4-methyl-2-pentanone;

(e) a salt including at least one cation selected from the group consisting of cations represented by the aforementioned formulas (C1) to (C4) and at least one anion selected from the group consisting of anions represented by the aforementioned formulas (A1) to (A4).

As described above, with this manufacturing method, a small amount of cations migrate from the base layer into the coating film of the composition for forming the surface, and heteroaggregates of the first particles and second particles are formed in the coating film due to an increase in the cation concentration during coating film curing, thereby forming protruded portions.

The coating method is not particularly limited and known methods can be used. In the examples and comparative examples described below, a dip coating method was used.

For example, a coating film of the curable composition is formed on the surface of the base layer by fitting the base layer around the outer periphery of a cylindrical mold, sealing the ends, dipping the mold in a container filled with the curable composition, and pulling up so that the relative speed between the liquid level of the curable composition and the base layer is constant. The pulling speed (relative speed between the liquid level of the curable composition and the base layer), the solvent ratio of the curable composition, and the like can be adjusted according to the desired film thickness.

For example, the pulling speed can be set to 10 mm/sec to 50 mm/sec.

After the coating film is formed, the coating film is dried and cured. In the step of drying the coating film, the drying temperature, humidity, and drying time can be adjusted, as appropriate, depending on the type of solvent, solvent ratio, film thickness, and the like. The drying temperature is preferably, for example, 20° C. to 30° C. The relative humidity during drying is preferably 40% to 70%. The drying time is preferably 30 sec to 300 sec. It is also preferable to exhaust air during drying. The exhaust conditions are not particularly limited as long as they are sufficient to remove the solvent, but the exhaust air flow rate is preferably 10 $m^3$/min to 50 $m^3$/min, and more preferably 30 $m^3$/min to 50 $m^3$/min. The above drying makes it easier for the cationic components to migrate.

Then, the dried coating film is cured to obtain a surface layer. For example, it can be cured by UV irradiation. The integrated light quantity can be set, as appropriate, depending on the material used. For example, it can be set to 300 $mJ/cm^2$ to 2000 $mJ/cm^2$.

The sum of the content of the first particles and the content of the second particles in the surface layer is preferably 18.0% by mass to 37.0% by mass, and more preferably 20.0% by mass to 35.5% by mass based on the mass of the surface layer.

Further, the content of the first particles in the surface layer is preferably 1.0% by mass to 27.0% by mass, more preferably 7.0% by mass to 27.0% by mass, and even more preferably 8.0% by mass to 25.0% by mass based on the mass of the surface layer.

Furthermore, the content of the second particles in the surface layer is preferably 13.5% by mass to 25.0% by mass, and more preferably 14.5% by mass to 22.0% by mass based on the mass of the surface layer.

In addition, in the case where heteroaggregates of the first particles and second particles in the coating film of the composition for forming a surface layer that was formed on the base layer are generated by the ionic conducting agent in the base layer, the sum of the contents of cations and anions in the base layer is preferably from 0.8% by mass to 3.5% by mass, and more preferably 1.0% by mass to 3.0% by mass based on the mass of the base layer. By setting the content of the ionic conducting agent in the base layer within the above range, the heteroaggregates of the first particles and second particles can be formed more efficiently in the surface layer. As a result, the arithmetic mean height (Sa) of the outer surface of the surface layer can be set to 0.1 μm to 0.7 μm more easily.

Electrophotographic Image Forming Apparatus

Figure 2:
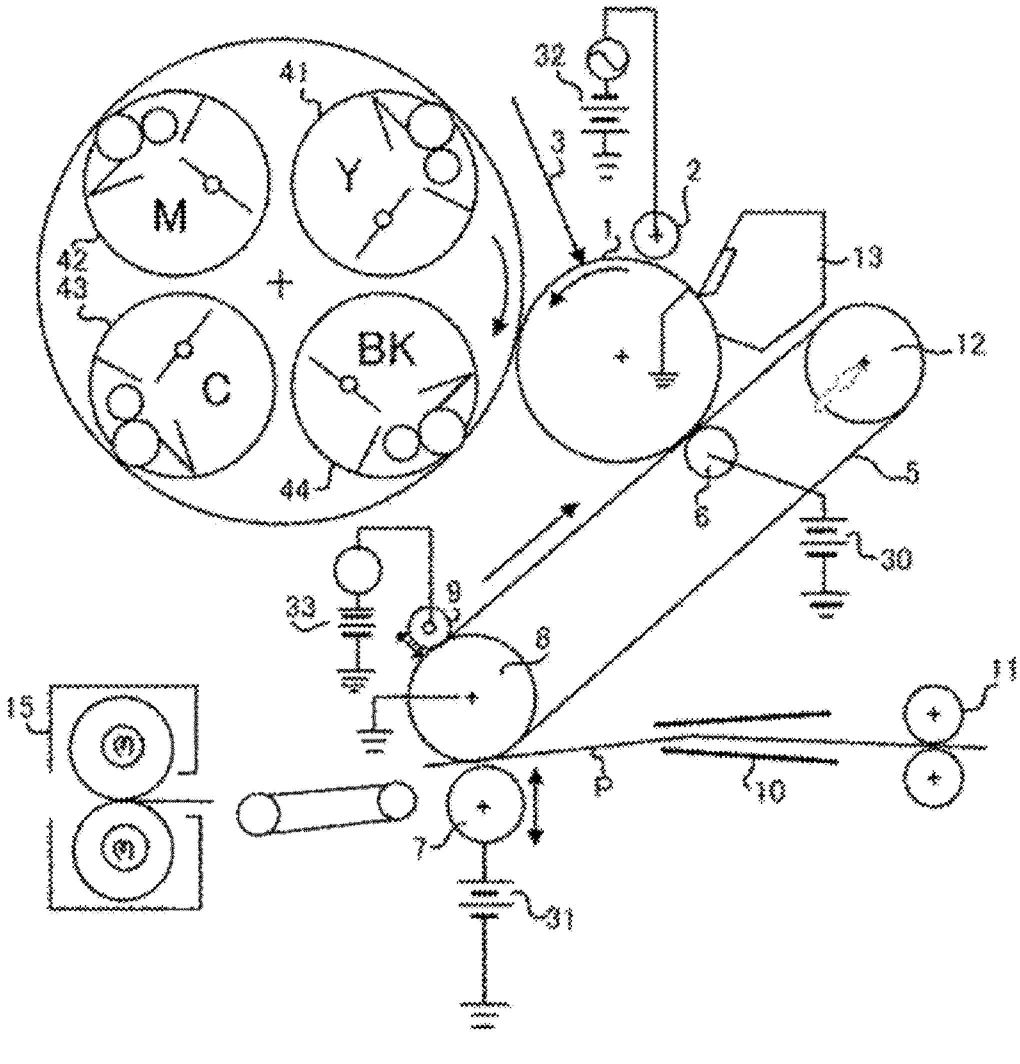
FIG. 2 is an explanatory drawing of an electrophotographic image forming apparatus.

An electrophotographic image forming apparatus (hereinafter also referred to as an "electrophotographic apparatus") will be described hereinbelow. FIG. 2 is a cross-sectional view of a full-color electrophotographic apparatus. It is preferable that the electrophotographic apparatus be provided with an electrophotographic belt as an intermediate transfer belt. It is preferable that the electrophotographic belt be an intermediate transfer belt. In FIG. 2, a cylindrical electrophotographic seamless belt is used as an intermediate transfer belt 5.

The electrophotographic photosensitive member 1 is a drum-shaped electrophotographic photosensitive member (hereinafter referred to as a "photosensitive drum") that is repeatedly used as a first image bearing member and is rotationally driven at a predetermined peripheral speed (process speed) in the direction of the arrow.

During the rotation process, the photosensitive drum 1 is uniformly charged to a predetermined polarity and potential by a primary charger 2. Reference numeral 32 stands for a power source. The photosensitive drum is then subjected to image exposure 3 by an exposure means, whereby an electrostatic latent image corresponding to a first color component image (for example, a yellow color component image) of the target color image is formed. Examples of the exposure means include a color separation/imaging exposure optical system for a color original image, a scanning exposure system using a laser scanner that outputs a laser beam modulated in response to the time-series electrical digital pixel signals of image information.

Then, the electrostatic latent image on the photosensitive drum is developed with yellow toner Y as the first color by a first developing device (yellow developing device 41). At this time, the second to fourth developing devices (magenta developing device 42, cyan developing device 43, black developing device 44) are turned off and do not act on the photosensitive drum 1, so the yellow toner image of the first color is not affected by the second to fourth developing devices. The electrophotographic belt 5 is rotationally driven in the direction of the arrow at the same peripheral speed as the photosensitive drum 1.

The yellow toner image on the photosensitive drum 1 is transferred to the outer peripheral surface of the intermediate transfer belt 5 by an electric field formed by a primary transfer bias applied to the electrophotographic belt 5 from a power source 30 via the primary transfer opposing roller 6 when passing through a nip portion between the photosensitive drum 1 and the intermediate transfer belt 5 (primary transfer). The surface of the photosensitive drum 1 after the transfer of the yellow toner image of the first color to the electrophotographic belt 5 is cleaned by a cleaning device 13.

Then, similarly, a magenta toner image of the second color, a cyan toner image of the third color, and a black toner image of the fourth color are transferred in sequence and superimposed on the electrophotographic (intermediate transfer) belt 5 to form a composite color toner image corresponding to the target color image. A secondary transfer roller 7 is supported by bearings in parallel with a driving roller 8 and disposed in a state in which it can be separated from the lower surface of the electrophotographic belt 5.

During the step of primary transferring the toner images of the first to third colors from the photosensitive drum 1 to the electrophotographic belt 5, the secondary transfer roller 7 can also be separated from the electrophotographic belt 5. The transfer of the composite color toner image transferred onto the electrophotographic belt 5 to a transfer material P, which is the second image bearing member, is performed as follows.

First, the secondary transfer roller 7 is brought into contact with the electrophotographic belt 5, and the transfer material P is fed at a predetermined timing from a feed roller 11 through a transfer material guide 10 to the contact nip between the electrophotographic belt 5 and the secondary transfer roller 7. Then, a secondary transfer bias is applied from a power source 31 to the secondary transfer roller 7. This secondary transfer bias transfers (secondary transfer) the composite color toner image from the electrophotographic (intermediate transfer) belt 5 to the transfer material P, which is the second image bearing member.

The transfer material P to which the toner image has been transferred is introduced into a fixing device 15 and heated and fixed. After the image transfer to the transfer material P is completed, an intermediate transfer belt cleaning roller 9 of the cleaning device is brought into contact with the electrophotographic belt 5, and a bias of the opposite polarity to that of the photosensitive drum 1 is applied. As a result, a charge of the opposite polarity to that of the photosensitive drum 1 is imparted to the toner that has not transferred to the transfer material P and remained on the electrophotographic belt 5 (untransferred toner). Reference numeral 33 stands for a bias power source. The untransferred toner is electrostatically transferred to the photosensitive drum 1 at the nip portion with the photosensitive drum 1 and in the vicinity thereof, thereby cleaning the electrophotographic belt 5.

Evaluation Methods

The measurement methods and evaluation methods of the physical properties related to the present disclosure will be described hereinbelow.

Roughness: Arithmetic Mean Height Sa

The arithmetic mean height Sa of the surface layer is measured using a scanning white light interference microscope (product name: VertScan, manufactured by Ryoka Systems Inc.). Observation is performed at 50× magnification, and the image obtained is subjected to fourth-order surface correction, after which Sa is obtained from the corrected image. Four images are obtained, Sa is measured, and the arithmetic mean value is adopted.

Adhesion to Other Components

Figure 3:
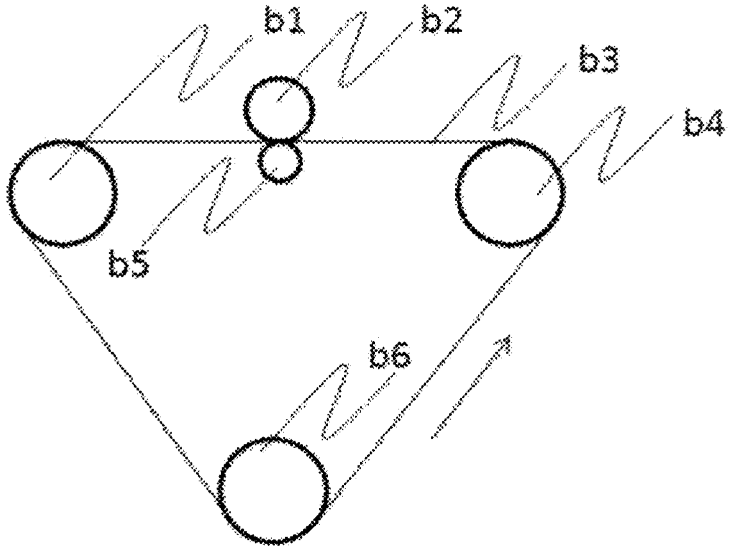
FIG. 3 is a schematic diagram of a jig for evaluating adhesion between an electrophotographic belt and other members.

The adhesion to the photosensitive drum of a full-color electrophotographic device (product name: LBP-5200, manufactured by Canon Inc.) is measured using a jig as shown in FIG. 3. An electrophotographic belt b3 is tensioned by a driving roller b1 equipped with a motor and a torque meter, a driven roller b4, and a tension roller b6 that applies tension to the electrophotographic belt b3. The photosensitive drum and transfer roller of the LBP-5200 are used for a photosensitive drum b2 and a backup roller b5, respectively.

The electrophotographic belt is rotated at 180 mm/sec without contacting the photosensitive drum, and the torque value at that time is measured. This value is denoted by "Tq1". Next, while rotating the electrophotographic belt at 180 mm/sec, the maximum torque is measured when the photosensitive drum is brought into contact with 700 gf. This value is denoted by "Tq2". The difference between "Tq2" and "Tq1" is used as an index for evaluating the adhesion between the electrophotographic belt and the photosensitive drum. Where the difference is less than 0.10 Nm, the evaluation rank is "A", and where it is 0.10 Nm or more, the evaluation rank is "B".

The adhesion is evaluated initially and after durability testing. For the initial adhesion evaluation, an unused electrophotographic belt manufactured in the example is used. For the adhesion evaluation after durability testing, measurements are made after forming 50,000 electrophotographic images using the full-color electrophotographic device described above.

Furthermore, when the electrophotographic belt and the photosensitive drum are brought into contact with each other, the photosensitive drum is fixed without rotating, so that the contact surface of the photosensitive drum is always in a state of a new product.

Singular Points (Lumps)

The positions of singular points (lumps) on the obtained electrophotographic belt are identified visually, and then observed by measurement with a laser microscope, and singular points (lumps) with a height of 20 μm or more present in the surface layer are counted. The height of the singular points (lumps) is determined as the difference in height between the peak top and the flat part of the shape profile. Singular points (lumps) can be recognized visually on the outer surface of the surface layer. They are protruded portions that can be recognized as foreign matter that is present locally.

Presence or Absence of Heteroaggregates

A sample cut out from the surface layer of the electrophotographic belt using a microtome or the like is observed using a transmission electron microscopy (TEM), and a cross-sectional photograph in the thickness direction of the surface layer is taken. Specifically, Talos 200 manufactured by FEI Co. was used.

In addition, elemental analysis is performed by the EDX method (energy dispersive X-ray spectroscopy) using a transmission electron microscope. Specifically, the analysis is performed using Talos 200 manufactured by FEI Co. at an acceleration voltage of 200 kV. Each particle in the cross-sectional TEM photograph is clearly classified into a first particle or a second particle. If there is an aggregate containing both a first particle and a second particle, it is determined that a heteroaggregate is present.

Presence or Absence of Protruded Portions Derived from Heteroaggregates

A sample cut out from the surface layer of the electrophotographic belt using a microtome or the like is observed using a transmission electron microscope (TEM), and a cross-sectional photograph in the thickness direction of the surface layer is taken. The procedure is the same as that for determining the presence or absence of heteroaggregates described above. At this time, the photograph is taken so as to include the outermost surface of the surface layer.

In addition, as in the procedure for determining the presence or absence of heteroaggregates described above, elemental analysis is performed by EDX (energy dispersive X-ray spectroscopy), and each particle in the cross-sectional TEM photograph is clearly classified into a first particle or a second particle.

Where the surface layer includes an aggregate containing a first particle and a second particle, i.e., a heteroaggregate, and a protruded portion reflecting the shape of the heteroaggregate is formed on the outermost surface of the surface layer, the protruded portion is determined to be derived from the heteroaggregate. The protruded portion is determined to be a portion where the heteroaggregate itself is exposed on the outer surface of the surface layer, and a portion where the matrix resin of the surface layer that covers the heteroaggregate is raised, and other portions are determined to be non-protruded portions.

Number-Average Particle Diameter of Primary Particles, Value of Ratio of Maximum Length to Minimum Length of Primary Particles The number-average particle diameter of the primary particles of the first particles and second particles is determined by the following method.

For a sample cut out from the surface layer of the electrophotographic belt using a microtome or the like, a cross-sectional photograph in the thickness direction of the surface layer is taken using a transmission electron microscope (TEM). In addition, elemental analysis is performed using the EDX method (energy dispersive X-ray spectroscopy) to clearly distinguish between the first particles and second particles that constitute the heteroaggregates in the photograph obtained with the TEM. This was done in the same manner as in the procedure for determining the presence or absence of heteroaggregates.

Next, the sum of the maximum length and the minimum length of the primary particle of the projected image of the first particle that constitutes the heteroaggregate in the photograph is divided by 2 to obtain the particle diameter of the first particle. This operation is performed for 100 first particles that constitute the heteroaggregates, and the arithmetic mean value of the obtained primary particle diameters is used as the number-average particle diameter of the primary particles of the first particles.

Furthermore, by dividing the maximum length of the primary particle of the projected image of the first particle by the minimum length, the ratio of the maximum length of the primary particle to the minimum length can be obtained. This operation is performed for 100 first particles constituting the heteroaggregates, and the average value is taken as the ratio of the maximum length to the minimum length of the primary particles of the first particles.

The same is performed for the second particles constituting the heteroaggregates, the particle diameter of each of the primary particles of the 100 second particles constituting the heteroaggregates is obtained, and the arithmetic average value of these is taken as the number-average particle diameter of the primary particles of the second particles. The value of the ratio of the maximum length to the minimum length is found in the same manner, the value is obtained for each of the 100 second particles, and the average value is taken as the ratio of the maximum length to the minimum length of the primary particles of the second particles.

Content of Particles

The content of the first and second particles in the surface layer can be determined by the following method.

The surface layer is peeled off from the electrophotographic belt using a razor or the like and measured in air at 400° C. using a thermogravimetric analysis (TGA) device to obtain a profile of the measurement time vs. weight reduction rate. The initial mass is obtained from the profile. The mass at which the slope of the profile becomes constant is taken as the total mass of the particles. The sum (% by mass) of the contents of the first and second particles in the surface layer is taken as [total mass of particles]/[initial mass]×100.

The surface layer for which the mass has been measured is then heated to 400° C. and the mass of the residue is measured. The residue is then separated into the first and second particles by centrifugation or the like, and the mass of particles of each type is measured after drying. The value of [mass of first particles]/[mass of surface layer]×100 is taken as the content (% by mass) of the first particles in the surface layer. The value of [mass of second particles]/[mass of surface layer]×100 is taken as the content (% by mass) of the second particles in the surface layer.

Sum of Contents of Cations and Anions in Base Layer

The content of cations and anions in the base layer can be determined by the following method.

The base layer is peeled off from the electrophotographic belt using a razor or the like, and a 200 mg sample is cut out from the base layer and immersed in 1 mL of methanol. Then, 40 kHz ultrasonic waves are applied for 10 min to obtain an extract of anions and cations. The total amount of cations and anions contained in the 200 mg base layer can be determined by measuring the mass of the dried product obtained by removing the methanol from the extract. The value of [total mass (mg) of cations and anions]/[200 mg]×100 is taken as the sum (% by mass) of the contents of cations and anions in the base layer.

EXAMPLES

The following examples and comparative examples will be used to explain the present disclosure in detail, but the present disclosure is not limited to these.

Base Layer

Table 1 shows the compounding ratio of the materials constituting the base layer. The structural formula and name of the component (e) in the base layer are as shown in Table 2.

First, the materials shown in Table 1 were melted and mixed under the following conditions using a twin-screw kneading extruder (product name: PCM43, manufactured by Ikegai Co., Ltd.) in the compounding amounts shown in Table 1 to prepare a thermoplastic resin composition.

Extrusion rate: 6 kg/h

Screw rotation speed: 225 rpm

Barrel control temperature: 270° C.

The obtained thermoplastic resin composition was melt-extruded under the following conditions using a single-screw extruder (manufactured by Plastics Engineering Research Institute Co., Ltd.) equipped with a spiral cylindrical die (inner diameter: 195 mm, slit width 1.1 mm) at the tip to prepare a cylindrical film of the following size. The cylindrical film thus obtained was used as the base layer.

Extrusion rate: 6 kg/h

Die temperature: 290° C.

Size: outer diameter 201 mm, thickness 70 μm

Surface Layer

Table 3 shows the mixing ratio of the materials constituting the curable composition for forming the surface layer. In Table 3, where the material was a slurry, the solid components were adjusted to the compounding ratio shown in Table 3.

The curable composition was prepared as follows.

A slurry in which the component (a) was dispersed in a solvent, a slurry in which the component (b) was dispersed in a solvent, and a solution in which the component (c) was dissolved in a solvent were prepared in advance, and these, component (d), component (e), a polymerization initiator, and other components were placed in a container equipped with a stirrer in the ratios shown in Table 3 and stirred at room temperature for 30 min to obtain a curable composition.

The base layer obtained by the above extrusion molding was fitted around the outer periphery of a cylindrical mold, the ends were sealed, and the mold was dipped in a container filled with the curable composition and then pulled up so that the relative speed between the liquid level of the curable composition and the base layer was constant, thereby forming a coating film of the curable composition for forming a surface layer on the surface of the base layer.

In the examples and comparative examples, the pulling speed was set from 10 mm/sec to 50 mm/sec, and the thickness of the coating film of the curable composition was adjusted to 2 μm. The curable compositions were obtained by mixing at ratios shown in Table 3. After forming the coating film of the curable composition, the coating film was dried for 1 min in an environment of a temperature of 23° C. and a relative humidity of 55%, with an exhaust air flow rate of 40 $m^3$/min. Next, the dried coating film was irradiated with ultraviolet light using a UV irradiator (product name: UE06/81-3, manufactured by Eye Graphics Co., Ltd.) until the accumulated light quantity reached 600 mJ/$cm^2$, and the coating film was cured to form a surface layer. The thickness of the obtained surface layer was 2 μm as a result of observing the cross section with an electron microscope.

The dispersion liquids A and B used in Examples 23 to 27 were prepared by the following method.

Dispersion Liquid A

A total of 12.0 g of antimony-containing tin oxide particles (product name: SN-100P, manufactured by Ishihara Sangyo Kaisha, Ltd.), 0.12 g of acetic acid (manufactured by Kishida Chemical Co., Ltd.) as an organic acid, 0.03 g of trioctylamine (manufactured by Kishida Chemical Co., Ltd.) as an amine compound, and 48.0 g of isopropyl alcohol (manufactured by Kishida Chemical Co., Ltd.) as a solvent were weighed and placed in a 250 mL zirconia container. Furthermore, 108.3 g of zirconia beads with a diameter of 0.5 mm were added to the container. After that, the mixture was stirred at 400 rpm for 3 h using a planetary ball mill (model: P-6, manufactured by Fritsch Japan Co., Ltd.). The beads were then removed by mesh filtration to obtain a dispersion liquid A with a solid fraction concentration of ATO particles (i.e., the content of ATO particles in the dispersion liquid) of 20% by mass.

Dispersion Liquid B

A total of 100 g of antimony-containing tin oxide particles (product name: SN-100P, manufactured by Ishihara Sangyo Kaisha, Ltd.) were loaded in a Henschel mixer, 3.79 g of trimethoxymethylsilane (product name: KBM-13, manufactured by Shin-Etsu Silicone Co., Ltd.) was added dropwise while rotating the mixer, and the stirring was performed for 2 h. The powder was then removed and heated and dried in a drying furnace at 100° C. for 1 h to obtain ATO particles with a surface treatment rate of 30%.

A total of 12.50 g of the ATO particles with a surface treatment rate of 30%, 0.09 g of trioctylamine (manufactured by Kishida Chemical Co., Ltd.) as an amine compound, 0.50 g of a phosphate polyester (product name: BYK111, BYK-Chemie GmbH, molecular weight approximately from 800 to 1500) as a phosphorus compound, and 18.13 g of 2-butanone (manufactured by Kishida Chemical Co., Ltd.) as a solvent were weighed and placed in a 250 mL zirconia container. Furthermore, 42.86 g of zirconia beads with a diameter of 0.5 mm were added to the container. Then, the mixture was stirred at 400 rpm for 3 h using a planetary ball mill (model: P-6, Fritsch Japan Co., Ltd.). The beads were then removed by mesh filtration to obtain a dispersion liquid B with a solid fraction concentration of ATO particles (i.e., the content of ATO particles in the dispersion liquid) of 40% by mass.

Tables 4 and 5 show the combinations of base layers and curable compositions used in the Examples and Comparative Examples, as well as the evaluation results.

TABLE 1

| | Resin (f) | | Component (e) | |
|---|---|---|---|---|
| | No. | Compounded amount (parts by mass) | No. | Compounded amount (parts by mass) |
| Base layer 1 | f-1 | 99.0 | e-1 | 1.0 |
| Base layer 2 | f-1 | 98.5 | e-1 | 1.5 |
| Base layer 3 | f-1 | 97.0 | e-1 | 3.0 |
| Base layer 4 | f-1 | 99.0 | e-2 | 1.0 |
| Base layer 5 | f-1 | 97.0 | e-2 | 3.0 |
| Base layer 6 | f-1 | 99.0 | e-3 | 1.0 |
| Base layer 7 | f-1 | 97.0 | e-3 | 3.0 |
| Base layer 8 | f-1 | 99.0 | e-4 | 1.0 |
| Base layer 9 | f-1 | 97.0 | e-4 | 3.0 |
| Base layer 10 | f-1 | 99.0 | e-5 | 1.0 |
| Base layer 11 | f-1 | 97.0 | e-5 | 3.0 |
| Base layer 12 | f-2 | 99.0 | e-1 | 1.0 |
| Base layer 13 | f-1 | 97.0 | e-6 | 3.0 |
| Base layer 14 | f-1 | 97.0 | e-7 | 3.0 |

The following resins (f) were used:

f-1: polyethylene naphthalate, product name "TN-8065S", manufactured by Teijin Limited;

f-2: polyethylene terephthalate, product name "TRN-8550FF", manufactured by Teijin Limited.

TABLE 2

| No. | Structural formula | Name |
|---|---|---|
| e-1 | 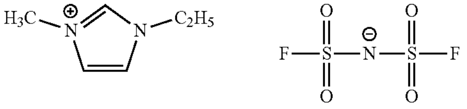 | 1-Ethyl-3-methylimidazolium bis(fluorosulfonium)imide (manufactured by Kanto Chemical Co., Inc.) |
| e-2 | 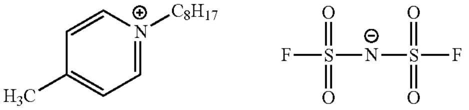 | Elexel AS-804 (manufactured by DKS Corp.) |
| e-3 | 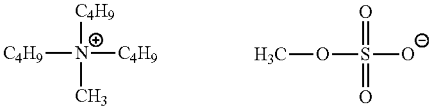 | Tributylmethyl ammonium methyl sulfate (manufactured by Santa Cruz Biotechnology) |
| e-4 | 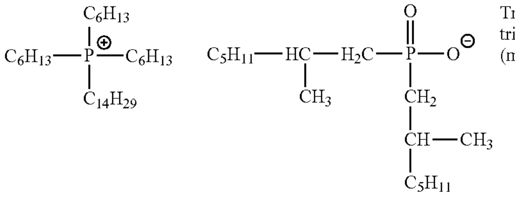 | Trihexyltetradecylphosphonium-bis(2,4,4-trimethylpentyl)phosphonate (manufactured by Sigma-Aldrich) |
| e-5 |  | Trihexyltetradecylphosphonium decanoate (manufactured by Sigma-Aldrich) |
| e-6 | 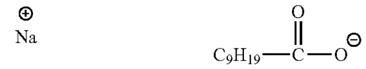 | Sodium decanoate (manufactured by Tokyo Chemical Industry Co., Ltd.) |
| e-7 | 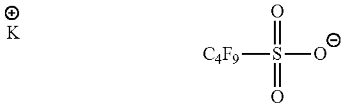 | Potassium nonafluorobutane sulfonate (manufactured by Mitsubishi Materials Electronic Chemicals Co., Ltd.) |

TABLE 3

| Curable composition | Component (a) No | Component (a) Compounded amount (parts) | Component (b) No. | Component (b) Compounded amount (parts) | Component (c) No. | Component (c) Compounded amount (parts) | Component (d) 4-methyl-2-pentanone Compounded amount (parts) | Component (d) 2-butanone Compounded amount (parts) | Polymerization initiator *3 Compounded amount (parts) | Solid silica particles having a particle diameter of 12 nm * 1 Compounded amount (parts) | Solid silica particles having a particle diameter of 1000 nm * 2 Compounded amount (parts) |
|---|---|---|---|---|---|---|---|---|---|---|---|
| 1 | a-1 | 9.0 | b-1 | 17.4 | c-1 | 100 | 520 | 70 | 7.6 | — | — |
| 2 | a-1 | 18.5 | b-1 | 17.4 | c-1 | 100 | 520 | 70 | 7.6 | — | — |
| 3 | a-1 | 18.5 | b-1 | 26.0 | c-1 | 100 | 520 | 70 | 7.6 | — | — |
| 4 | a-1 | 18.5 | b-1 | 32.5 | c-1 | 100 | 520 | 70 | 7.6 | — | — |
| 5 | a-1 | 37.0 | b-1 | 17.4 | c-1 | 100 | 520 | 70 | 7.6 | — | — |
| 6 | a-2 | 18.5 | b-1 | 17.4 | c-1 | 100 | 520 | 70 | 7.6 | — | — |
| 7 | a-3 | 18.5 | b-1 | 17.4 | c-1 | 100 | 520 | 70 | 7.6 | — | — |
| 8 | a-4 | 18.5 | b-1 | 17.4 | c-1 | 100 | 520 | 70 | 7.6 | — | — |
| 9 | — | — | b-1 | 17.4 | c-1 | 100 | 520 | 70 | 7.6 | 18.5 | — |
| 10 | — | — | b-1 | 17.4 | c-1 | 100 | 520 | 70 | 7.6 | — | 18.5 |
| 11 | a-1 | 18.5 | — | — | c-1 | 100 | 520 | 70 | 7.6 | — | — |
| 12 | a-1 | 1.0 | b-1 | 17.4 | c-1 | 100 | 520 | 70 | 7.6 | — | — |
| 13 | a-1 | 18.5 | b-2 | 17.4 | c-1 | 100 | 520 | 70 | 7.6 | — | — |
| 14 | a-1 | 18.5 | b-1 | 8.7 | c-1 | 100 | 520 | 70 | 7.6 | — | — |
| | | | b-2 | 8.7 | | | | | | | |

TABLE 3-continued

| Curable composition | Component (a) No | Component (a) Compounded amount (parts) | Component (b) No. | Component (b) Compounded amount (parts) | Component (c) No. | Component (c) Compounded amount (parts) | Component (d) 4-methyl-2-pentanone Compounded amount (parts) | Component (d) 2-butanone Compounded amount (parts) | Polymerization initiator *3 Compounded amount (parts) | Solid silica particles having a particle diameter of 12 nm * 1 Compounded amount (parts) | particles having Solid silica a particle diameter of 1000 nm * 2 Compounded amount (parts) |
|---|---|---|---|---|---|---|---|---|---|---|---|
| 15 | a-1 | 18.5 | b-3 | 17.4 | c-1 | 100 | 520 | 70 | 7.6 | — | — |
| 16 | a-1 | 18.5 | b-3 | 32.5 | c-1 | 100 | 520 | 70 | 7.6 | — | — |
| 17 | a-1 | 1.0 | b-3 | 17.4 | c-1 | 100 | 520 | 70 | 7.6 | — | — |
| 18 | a-1 | 18.5 | b-4 | 17.4 | c-1 | 100 | 520 | 70 | 7.6 | — | — |
| 19 | a-1 | 18.5 | b-3 | 8.7 | c-1 | 100 | 520 | 70 | 7.6 | — | — |
| | | | b-4 | 8.7 | | 100 | 520 | 70 | 7.6 | | |

In the table, parts indicate parts by mass.

a-1: hollow silica particle slurry, product name "Sururia 4110", manufactured by JGC Catalysts and Chemicals Co., Ltd.;

a-2: hollow silica particle slurry, product name "IPA-ST-L", manufactured by Nissan Chemical Co., Ltd.;

a-3: solid silica particle slurry, product name "IPA-ST-ZL", manufactured by Nissan Chemical Co., Ltd.;

a-4: solid silica particles, product name "QSG-170", manufactured by Shin-Etsu Chemical Co., Ltd.

In the table, the following are used as *1, *2, and *3.

*1: silica particle slurry, product name "IPA-ST", manufactured by Nissan Chemical Co., Ltd.;

*2: silica particles, product name "Seahoster KE-P100", manufactured by Nippon Shokubai Co., Ltd.;

*3: "Irgacure 907" (product name), manufactured by BASF Co., Ltd.

b-1: "Celnax CX-Z400K" (product name), manufactured by Nissan Chemical Co., Ltd.

b-2: "Celnax CX-Z210IP" (product name), manufactured by Nissan Chemical Co., Ltd.

b-3: Dispersion liquid A (slurry with "SN-100P" (product name) (manufactured by Ishihara Sangyo Kaisha, Ltd.) dispersed)

b-4: Dispersion liquid B (slurry with "SN-100P" (product name) (manufactured by Ishihara Sangyo Kaisha, Ltd.) dispersed)

c-1: "Aronix M-305" (product name), manufactured by Toa Gosei Co., Ltd.

TABLE 4

| Example No. | Base layer | Curable composition | Diameter of primary particles of component (a) (nm) | Component (a) is solid/hollow | Diameter of primary particles of component (b) (nm) | Amount of component (a) [% by mass] | Amount of component (b) [% by mass] | Sum of component (a) and (b) [% by mass] | Content of component (e) in base layer [% by mass] |
|---|---|---|---|---|---|---|---|---|---|
| 1 | 1 | 1 | 60 | Hollow | 20 | 7.1 | 13.8 | 20.9 | 1.0 |
| 2 | 1 | 2 | 60 | Hollow | 20 | 13.6 | 12.8 | 26.4 | 1.0 |
| 3 | 1 | 3 | 60 | Hollow | 20 | 12.8 | 18.0 | 30.8 | 1.0 |
| 4 | 1 | 4 | 60 | Hollow | 20 | 12.3 | 21.5 | 33.8 | 1.0 |
| 5 | 1 | 5 | 60 | Hollow | 20 | 24.0 | 11.3 | 35.3 | 1.0 |
| 6 | 2 | 2 | 60 | Hollow | 20 | 13.6 | 12.8 | 26.4 | 1.5 |
| 7 | 3 | 2 | 60 | Hollow | 20 | 13.6 | 12.8 | 26.4 | 3.0 |
| 8 | 4 | 2 | 60 | Hollow | 20 | 13.6 | 12.8 | 26.4 | 1.0 |
| 9 | 5 | 2 | 60 | Hollow | 20 | 13.6 | 12.8 | 26.4 | 3.0 |
| 10 | 6 | 2 | 60 | Hollow | 20 | 13.6 | 12.8 | 26.4 | 1.0 |
| 11 | 7 | 2 | 60 | Hollow | 20 | 13.6 | 12.8 | 26.4 | 3.0 |
| 12 | 8 | 2 | 60 | Hollow | 20 | 13.6 | 12.8 | 26.4 | 1.0 |
| 13 | 9 | 2 | 60 | Hollow | 20 | 13.6 | 12.8 | 26.4 | 3.0 |
| 14 | 10 | 2 | 60 | Hollow | 20 | 13.6 | 12.8 | 26.4 | 1.0 |
| 15 | 11 | 2 | 60 | Hollow | 20 | 13.6 | 12.8 | 26.4 | 3.0 |
| 16 | 1 | 6 | 45 | Solid | 20 | 13.6 | 12.8 | 26.4 | 1.0 |
| 17 | 1 | 7 | 80 | Solid | 20 | 13.6 | 12.8 | 26.4 | 1.0 |
| 18 | 1 | 8 | 170 | Solid | 20 | 13.6 | 12.8 | 26.4 | 1.0 |
| 19 | 12 | 2 | 60 | Hollow | 20 | 13.6 | 12.8 | 26.4 | 1.0 |
| 20 | 1 | 12 | 60 | Hollow | 20 | 0.8 | 12.8 | 13.6 | 1.0 |
| 21 | 1 | 13 | 60 | Hollow | 20 | 13.6 | 12.8 | 26.4 | 1.0 |
| 22 | 1 | 14 | 60 | Hollow | 20 | 13.6 | 12.8 | 26.4 | 1.0 |
| 23 | 1 | 15 | 60 | Hollow | 20 | 13.6 | 12.8 | 26.4 | 1.0 |
| 24 | 1 | 16 | 60 | Hollow | 20 | 13.6 | 21.5 | 35.1 | 1.0 |
| 25 | 1 | 17 | 60 | Hollow | 20 | 0.8 | 12.8 | 13.6 | 1.0 |
| 26 | 1 | 18 | 60 | Hollow | 20 | 13.6 | 12.8 | 26.4 | 1.0 |
| 27 | 1 | 19 | 60 | Hollow | 20 | 13.6 | 12.8 | 26.4 | 1.0 |
| Comparative Example 1 | 3 | 9 | 12 | Solid | 20 | 13.6 | 12.8 | 26.4 | 1.0 |
| Comparative Example 2 | 1 | 10 | 1000 | Solid | 20 | 13.6 | 12.8 | 26.4 | 1.0 |

TABLE 4-continued

| Example No. | Base layer | Curable composition | Diameter of primary particles of component (a) (nm) | Component (a) is solid/hollow | Diameter of primary particles of component (b) (nm) | Amount of component (a) [% by mass] | Amount of component (b) [% by mass] | Sum of component (a) and (b) [% by mass] | Content of component (e) in base layer [% by mass] |
|---|---|---|---|---|---|---|---|---|---|
| Comparative Example 3 | 3 | 11 | 60 | Hollow | 20 | 15.3 | 0.0 | 15.3 | 1.0 |
| Comparative Example 4 | 13 | 2 | 60 | Hollow | 20 | 13.6 | 12.8 | 26.4 | 3.0 |
| Reference Example 1 | 14 | 2 | 60 | Hollow | 20 | 13.6 | 12.8 | 26.4 | 3.0 |

In the table, the diameter of primary particles indicates the number-average particle diameter of the primary particles.

The amount of component (a) indicates the content [1% by mass] of the first particles in the surface layer.

The amount of component (b) indicates the content [1% by mass] of the second particles in the surface layer.

The sum of component (a) and component (b) indicates the total content [1% by mass] of the first particles and second particles in the surface layer.

The amount of component (e) in the base layer indicates the sum [1% by mass] of the cations and anions in the base layer.

Examples 1 to 15 and 19 to 27

In the electrophotographic belts according to Examples 1 to 15 and 19 to 27, the presence of component (e) in the base layer caused heteroaggregation of components (a) and (b) in the curable composition, resulting in a surface roughness Sa within the range of 0.1 μm to 0.7 μm. In addition, the adhesion to other members was low both initially and after durability testing, and there were few singular points (number of lumps).

The number-average particle diameter of the primary particles of the silica particles and conductive metal oxide particles constituting the heteroaggregates was as shown in Table 4 above.

TABLE 5

| Example No. | Base layer | Curable composition | Presence/absence of heteroaggregation | Presence/absence of protruded portions | Roughness Sa (μm) | Adhesion to other members: Initial | Adhesion to other members: After durability testing | Number (pieces) of singular points (lumps) |
|---|---|---|---|---|---|---|---|---|
| 1 | 1 | 1 | Present | Present | 0.3 | A | A | 0 |
| 2 | 1 | 2 | Present | Present | 0.3 | A | A | 0 |
| 3 | 1 | 3 | Present | Present | 0.3 | A | A | 0 |
| 4 | 1 | 4 | Present | Present | 0.3 | A | A | 0 |
| 5 | 1 | 5 | Present | Present | 0.3 | A | A | 0 |
| 6 | 2 | 2 | Present | Present | 0.5 | A | A | 0 |
| 7 | 3 | 2 | Present | Present | 0.7 | A | A | 0 |
| 8 | 4 | 2 | Present | Present | 0.2 | A | A | 0 |
| 9 | 5 | 2 | Present | Present | 0.3 | A | A | 0 |
| 10 | 6 | 2 | Present | Present | 0.2 | A | A | 0 |
| 11 | 7 | 2 | Present | Present | 0.3 | A | A | 0 |
| 12 | 8 | 2 | Present | Present | 0.1 | A | A | 0 |
| 13 | 9 | 2 | Present | Present | 0.2 | A | A | 0 |
| 14 | 10 | 2 | Present | Present | 0.1 | A | A | 0 |
| 15 | 11 | 2 | Present | Present | 0.2 | A | A | 0 |
| 16 | 1 | 6 | Present | Present | 0.2 | A | A | 5 |
| 17 | 1 | 7 | Present | Present | 0.5 | A | A | 5 |
| 18 | 1 | 8 | Present | Present | 0.7 | A | A | 10 |
| 19 | 12 | 2 | Present | Present | 0.5 | A | A | 0 |
| 20 | 1 | 12 | Present | Present | 0.2 | A | A | 0 |
| 21 | 2 | 13 | Present | Present | 0.3 | A | A | 0 |
| 22 | 3 | 14 | Present | Present | 0.4 | A | A | 0 |
| 23 | 4 | 15 | Present | Present | 0.3 | A | A | 0 |
| 24 | 5 | 16 | Present | Present | 0.3 | A | A | 0 |
| 25 | 6 | 17 | Present | Present | 0.2 | A | A | 0 |
| 26 | 7 | 18 | Present | Present | 0.3 | A | A | 0 |
| 27 | 8 | 19 | Present | Present | 0.4 | A | A | 0 |
| Comparative Example 1 | 3 | 9 | Present | Absent | 0.04 | B | B | 0 |
| Comparative Example 2 | 1 | 10 | Present | Present | 0.8 | A | A | 80 |
| Comparative Example 3 | 3 | 11 | Absent | Absent | 0.04 | B | B | 0 |
| Comparative Example 4 | 13 | 2 | Absent | Absent | 0.04 | B | B | 0 |
| Reference Example 1 | 14 | 2 | Present | Present | 0.5 | A | A | 0 |

The ratio of the maximum length to the minimum length of the silica particles constituting the heteroaggregates and the ratio of the maximum length to the minimum length of the conductive metal oxide particles were all within 1.0 to 1.2.

Examples 16 to 18

In the electrophotographic belts according to Examples 16 to 18, the presence of component (e) in the base layer caused heteroaggregation of components (a) and (b) in the curable composition, resulting in a surface roughness Sa within the range of 0.2 m to 0.7 μm. In addition, the adhesion to other members was low both initially and after durability testing.

The number-average particle diameter of the primary particles of the silica particles and conductive metal oxide particles constituting the heteroaggregates was as shown in Table 4 above.

In this example, the number of singularities (number of lumps) was greater than in Examples 1 to 16 because solid silica particles were used, but still was within the acceptable range.

Furthermore, the ratio of the maximum length of the silica particles constituting the heteroaggregates to the minimum length thereof and the ratio of the maximum length of the conductive metal oxide particles to the minimum length thereof were all within 1.0 to 1.2.

Comparative Example 1

Since the particle diameter of the hollow/solid silica in the curable composition for forming the surface layer was less than 40 nm, heteroaggregation occurred, but the surface of the surface layer did not have the specified roughness. As a result, the electrophotographic belt according to this comparative example had high adhesion to other members both initially and after durability testing.

Comparative Example 2

Since 1000 nm silica particles were added to the curable composition, the surface of the surface layer had a specified roughness. Therefore, the adhesion of the electrophotographic belt according to this comparative example to other members was low both initially and after durability testing.

However, because the surface was roughened using particles with a large particle diameter, there were many singular points (lumps), and many dot-like image defects occurred in the electrophotographic image formed using an image forming apparatus incorporating the electrophotographic belt according to this comparative example.

Comparative Example 3

Since the curable composition for forming the surface layer did not contain component (b) (second particles), heteroaggregates were not formed in the coating film of the curable composition for forming the surface layer during the process of forming the surface layer. Therefore, the specified roughness was not formed on the surface of the electrophotographic belt according to this comparative example. As a result, the electrophotographic belt according to this comparative example had high adhesion to other members after durability testing.

Comparative Example 4

Since the salt contained in the base layer was a salt of a non-PFAS anion and an alkali metal cation, heteroaggregates were not formed in the process of forming the surface layer. Therefore, the specified roughness was not formed on the surface of the electrophotographic belt according to this comparative example. As a result, the electrophotographic belt according to this comparative example had high adhesion to other members.

Reference Example 1

The salt contained in the base layer was a salt of a PFAS anion and an alkali metal cation. The PFAS anion is prone to ion dissociation because the negative charge is delocalized. As a result, heteroaggregation occurs, a certain roughness is formed on the surface of the surface layer, and the adhesion of the electrophotographic belt to other members is low both initially and after durability testing.

While the present invention has been described with reference to exemplary embodiments, it is to be understood that the invention is not limited to the disclosed exemplary embodiments. The scope of the following claims is to be accorded the broadest interpretation so as to encompass all such modification and equivalent structures and functions.

This application claims the benefit of Japanese Patent Application No. 2023-196252 filed Nov. 17, 2023 and Japanese Patent Application No 2024-124522, filed Jul. 31, 2024, which are hereby incorporated by reference herein in their entirety.

What is claimed is:

1. An electrophotographic belt comprising:

a base layer; and a surface layer in direct contact with the base layer, wherein the surface layer comprises heteroaggregates of a first particle and a second particle different from the first particle, wherein the first particle is at least one selected from the group consisting of a hollow silica particle and a solid silica particle, and has a number-average particle diameter of primary particles, which is greater than 30 nm to less than 100 nm, wherein the second particle comprises a conductive metal oxide, and has a number-average particle diameter of primary particles of 5 nm to 40 nm, wherein the surface layer has protruded portions derived from the heteroaggregates on an outer surface opposite to a surface facing the base layer, wherein an arithmetic mean height (Sa) of the outer surface is 0.1 μm to 0.7 μm, and wherein the base layer comprises:

at least one cation selected from the group consisting of cations represented by formulas (C1) to (C4); and at least one anion selected from the group consisting of anions represented by formulas (A1) to (A4):

(C1)

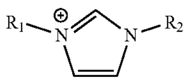

(C2)

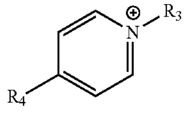

-continued (C3)

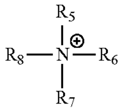

(C4)

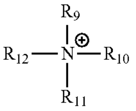

(A1)

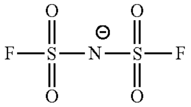

(A2)

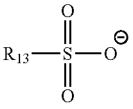

(A3)

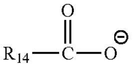

(A4)

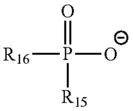

wherein $R_1$ to $R_{12}$ are each independently a hydrogen atom or a hydrocarbon group having 1 to 14 carbon atoms, where at least one selected from the group consisting of $R_1$ and $R_2$, at least one selected from the group consisting of $R_3$ and $R_4$, at least one selected from the group consisting of $R_5$ to $R_8$, and at least one selected from the group consisting of $R_9$ to $R_{12}$ are linear or branched alkyl groups having 1 to 14 carbon atoms, and wherein $R_{13}$ to $R_{16}$ are each independently a hydrogen atom, a hydrocarbon group having 1 to 18 carbon atoms, or an alkoxy group having 1 to 18 carbon atoms.

2. The electrophotographic belt according to claim 1, wherein the second particle includes at least one selected from the group consisting of a zinc antimonate particle and an antimony-containing tin oxide particle.

3. The electrophotographic belt according to claim 1, wherein the second particle comprises a zinc antimonate particle.

4. The electrophotographic belt according to claim 1, wherein a content of the first particle in the surface layer is 1.0% by mass to 27.0% by mass, based on a mass of the surface layer.

5. The electrophotographic belt according to claim 1, wherein a sum of a content of the first particle and a content of the second particle in the surface layer is 18.0% by mass to 37.0% by mass, based on a mass of the surface layer.

6. The electrophotographic belt according to claim 1, wherein a content of the first particle in the surface layer is 7.0% by mass to 27.0% by mass, based on a mass of the surface layer.

7. The electrophotographic belt according to claim 1, wherein a content of the second particle in the surface layer is 13.5% by mass to 25.0% by mass, based on a mass of the surface layer.

8. The electrophotographic belt according to claim 1, wherein a sum of a content of the cations and a content of the anions in the base layer is 0.8% by mass to 3.5% by mass, based on a mass of the base layer.

9. The electrophotographic belt according to claim 1, wherein the first particle is a hollow silica particle.

10. The electrophotographic belt according to claim 1, wherein the electrophotographic belt is an intermediate transfer belt.

11. An electrophotographic image forming apparatus comprising the electrophotographic belt according to claim 1 as an intermediate transfer belt.

12. A method for manufacturing an electrophotographic belt having a base layer and a surface layer in direct contact with the base layer, the method comprising the steps of:

preparing a base layer comprising a component (e);

preparing a curable composition comprising components (a) to (d);

forming a coating film of the curable composition on one surface of the base layer and drying the coating film; and curing the dried coating film, wherein the component (a) is a first particle being at least one selected from the group consisting of a hollow silica particle and a solid silica particle, and having a number-average particle diameter of primary particles, which is greater than 30 nm to less than 100 nm, the component (b) is a second particle being different from the first particle and comprising a conductive metal oxide, and having a number-average particle diameter of primary particles of 5 nm to 40 nm;

the component (c) is a (meth)acrylic monomer;

the component (d) is at least one solvent selected from the group consisting of 2-butanone and 4-methyl-2-pentanone;

the component (e) is a salt comprising at least one cation selected from the group consisting of cations represented by formulas (C1) to (C4) and at least one anion selected from the group consisting of anions represented by formulas (A1) to (A4):

(C1)

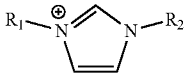

(C2)

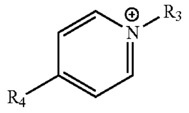

(C3)

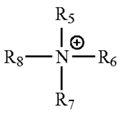

(C4)

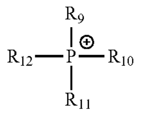

(A1)

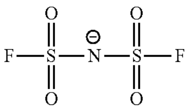

-continued (A2)

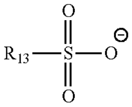

(A3)

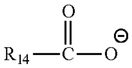

(A4)

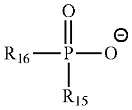

wherein $R_1$ to $R_{12}$ are each independently a hydrogen atom or a hydrocarbon group having 1 to 14 carbon atoms, where at least one selected from the group consisting of $R_1$ and $R_2$, at least one selected from the group consisting of $R_3$ and $R_4$, at least one selected from the group consisting of $R_5$ to $R_8$, and at least one selected from the group consisting of $R_9$ to $R_{12}$ are linear or branched alkyl groups having 1 to 14 carbon atoms, and wherein $R_{13}$ to $R_{16}$ are each independently a hydrogen atom, a hydrocarbon group having 1 to 18 carbon atoms, or an alkoxy group having 1 to 18 carbon atoms.

* * * * *